US007525277B2

(12) United States Patent
Bejean et al.

(10) Patent No.: US 7,525,277 B2
(45) Date of Patent: Apr. 28, 2009

(54) COMMAND-TRANSMITTING DEVICE FOR CONTROLLING A MOTORIZED BLIND WITH ORIENTABLE SLATS

(75) Inventors: Alain Bejean, Gruffy (FR); Norbert Dupielet, Sallanches (FR); Olivier Poulet, Fillinges (FR)

(73) Assignee: Somfy SAS, Cluses (FR)

( * ) Notice: Subject to any disclaimer, the term of this patent is extended or adjusted under 35 U.S.C. 154(b) by 346 days.

(21) Appl. No.: 11/487,739

(22) Filed: Jul. 17, 2006

(65) Prior Publication Data

US 2007/0018595 A1 Jan. 25, 2007

(30) Foreign Application Priority Data

Jul. 25, 2005 (FR) .................................. 05 07888

(51) Int. Cl.
*G05B 19/29* (2006.01)

(52) U.S. Cl. .......................... 318/600; 318/16; 318/283

(58) Field of Classification Search ................. 318/600, 318/16, 283, 280, 490, 466, 467, 468; 160/331
See application file for complete search history.

(56) References Cited

U.S. PATENT DOCUMENTS 5,634,682 A * 6/1997 Young ....................... 296/97.8
2005/0001574 A1 1/2005 Bejean

FOREIGN PATENT DOCUMENTS

EP 1 486 640 A 12/2004

* cited by examiner

*Primary Examiner*—Karen Masih
(74) *Attorney, Agent, or Firm*—Frommer Lawrence & Haug LLP; Ronald R Santucci

(57) ABSTRACT

The command-transmitting device comprises control buttons (11, 12) and a movable control element (2*b*) movable in two directions along a theoretical axis of operation (D1), these control buttons and this movable control element being arranged on a first face (24) of the transmitting device, in which device the buttons (11, 12) are positioned outside of an exclusion zone (A) defined by two straight lines (C1, C2) intersecting in the center of the movable element and forming an angle (α) of 60°, the bisector of which is parallel to the theoretical axis of operation, and by a circle (21) whose center is on the center of the movable element and whose circumference is separated from the latter by a distance (d) of 20 mm, and the buttons (11, 12) controlling the movements of the slats in opposite directions are arranged on either side of the movable element (2*b*).

10 Claims, 3 Drawing Sheets

Fig.1
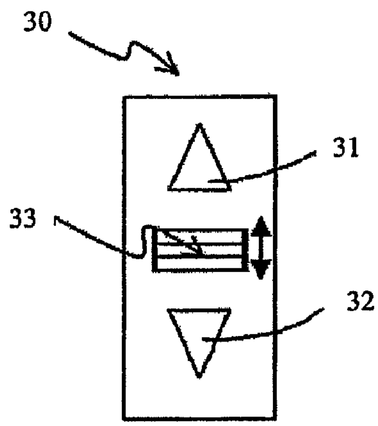
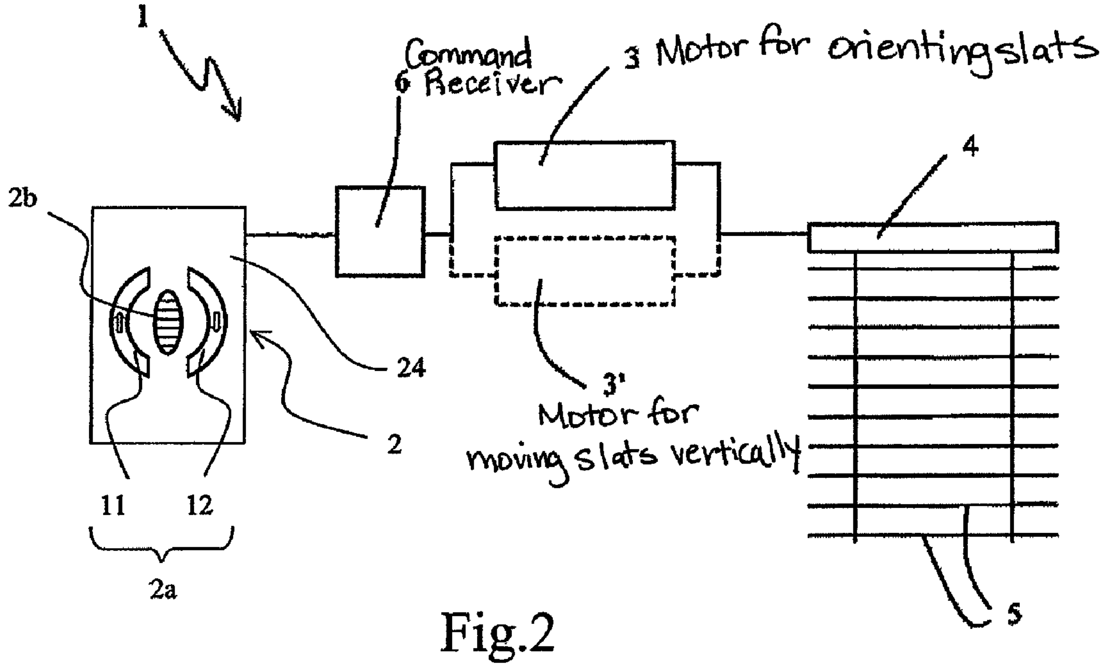
Fig.2

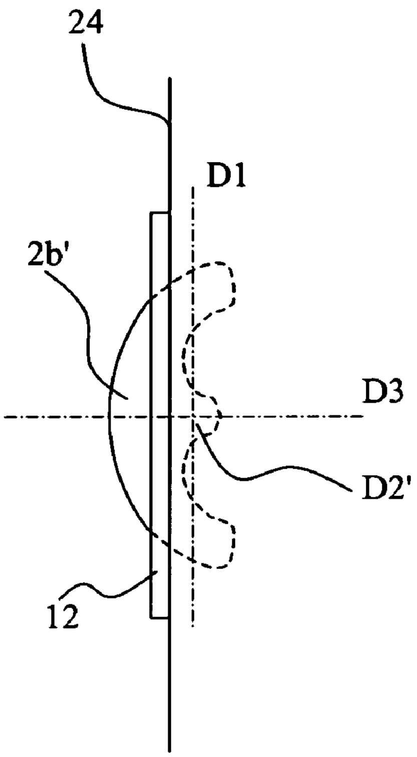
Fig.5
Fig.6
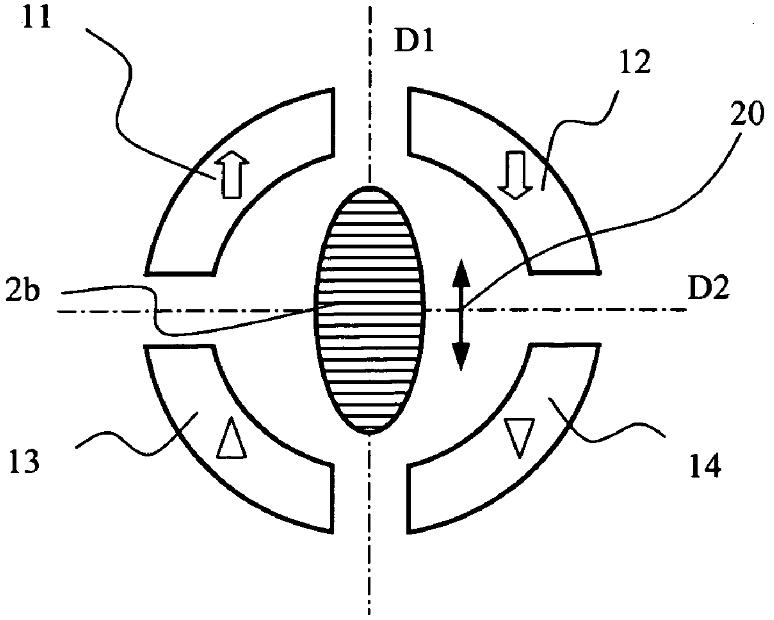

COMMAND-TRANSMITTING DEVICE FOR CONTROLLING A MOTORIZED BLIND WITH ORIENTABLE SLATS

This application claims priority benefits from French Patent Application No. 05 07888 filed Jul. 25, 2005.

BACKGROUND OF THE INVENTION

The invention relates to a command-transmitting device for controlling a motorized blind with orientable slats, comprising control buttons and a movable control element movable in two directions along a theoretical axis of operation, these control buttons and this movable control element being arranged on a first face of the transmitting device.

DESCRIPTION OF THE PRIOR ART

Application EP 1 486 640, which is incorporated by reference in the present application, discloses a command-transmitting device 30 (shown in FIG. 1) for controlling the movements of the slats of a blind. The slats can be moved translationally by pressing control buttons 31, 32 and rotated by turning a control wheel 33. Such a device makes the actions necessary for controlling the blind more intuitive. However, there are problems when it comes to operating the wheel because, unlike pressing a button where, once the button has reached the bottom of its travel, the user's action is stopped, there is nothing on the control device to stop the user's wheel-turning action. If this action continues past the wheel, the user may accidentally press the control buttons 31, 32.

It has also been noticed that the proximity of buttons designed to control the movements of the slats in opposite directions often results in incorrect operations by the user. This problem could be solved by moving the buttons further apart, but then the control device would be less compact.

It is an object of the invention to provide a command-transmitting device that solves the abovementioned drawbacks and improves on the known devices of the prior art. In particular, the invention provides a command-transmitting device by which unintentional user actions can be avoided partly by avoiding having uncontrolled user actions resulting in button presses and partly by avoiding having the user confuse the button functions.

SUMMARY OF THE INVENTION

In a first embodiment, the command-transmitting device comprises control buttons and a movable control element movable in two directions along a theoretical axis of operation. The control buttons and the movable control element is arranged on a first face of the transmitting device, in which device the buttons are positioned outside of an exclusion zone defined by two straight lines intersecting in the center of the movable element and forming an angle $\alpha$ of 60°, the bisector of which is parallel to the theoretical axis of operation, and by a circle whose center is on the center of the movable element and whose circumference is separated from the latter by a distance (d) of 20 mm. The buttons controlling the movements of the slats in opposite directions are arranged on either side of the movable element.

In a second embodiment, the command-transmitting device as described in the first embodiment comprises, in the exclusion zone, at least one end stop forming a protuberance on the first face near the movable element.

By way of explanation, it has been observed that the presence of a wheel on a transmitting device gives the user an excellent tactile point of reference for determining the position of his hand relative to the device. Thus, by arranging one button to control the movements (especially the translational movements) of the slats in one direction on one side of the wheel and another button to control the movements of the slats in the other direction on the other side of the wheel, the user will not confuse the buttons.

Various alternative embodiments include:

The command-transmitting device as described in the first embodiment further comprising four buttons arranged symmetrically relative to the projection onto the first face of the theoretical axis of operation and to the perpendicular to this projection passing through the center of the movable element.

The command-transmitting device as described in the first embodiment further comprising and electrical contact made by a movement of the movable element in a direction essentially perpendicular to the first face, this contact sending a command to stop the movement of the slats.

The command-transmitting device as described in the first embodiment, in which the movable element is a wheel rotatable about an axis, a translationally movable slider, or a button that can be rocked rotationally about an axis.

A command-transmitting device for controlling a motorized blind with orientable slats. comprising control buttons and a movable control element movable in two directions along a theoretical axis of operation. The control buttons and this movable control element are arranged on a first face of the transmitting device, in which device the buttons are positioned outside of an exclusion zone defined by two straight lines intersecting in the center of the movable element and forming an angle $\alpha$ of 50°, the bisector of which is parallel to the theoretical axis of operation, and by a circle whose center is on the center of the movable element and whose circumference is separated from the latter by a distance of 10 mm. The buttons controlling the movements of the slats in opposite directions are arranged on either side of the movable element.

The accompanying drawing shows, by way of example, various alternative embodiments of a command-transmitting device for controlling a slatted blind according to the invention.

DESCRIPTION OF THE DRAWINGS

FIG. 1 is a diagram of a known command-transmitting device of the prior art.

FIG. 2 is a diagram of a transmitting device according to the invention for controlling a blind.

FIGS. 3, 4, 5 and 6 are detail views of various alternative embodiments of the transmitting device, FIG. 4 being a cross section and FIG. 5 a side view.

DESCRIPTION OF THE PREFERRED EMBODIMENTS

Figure 3:
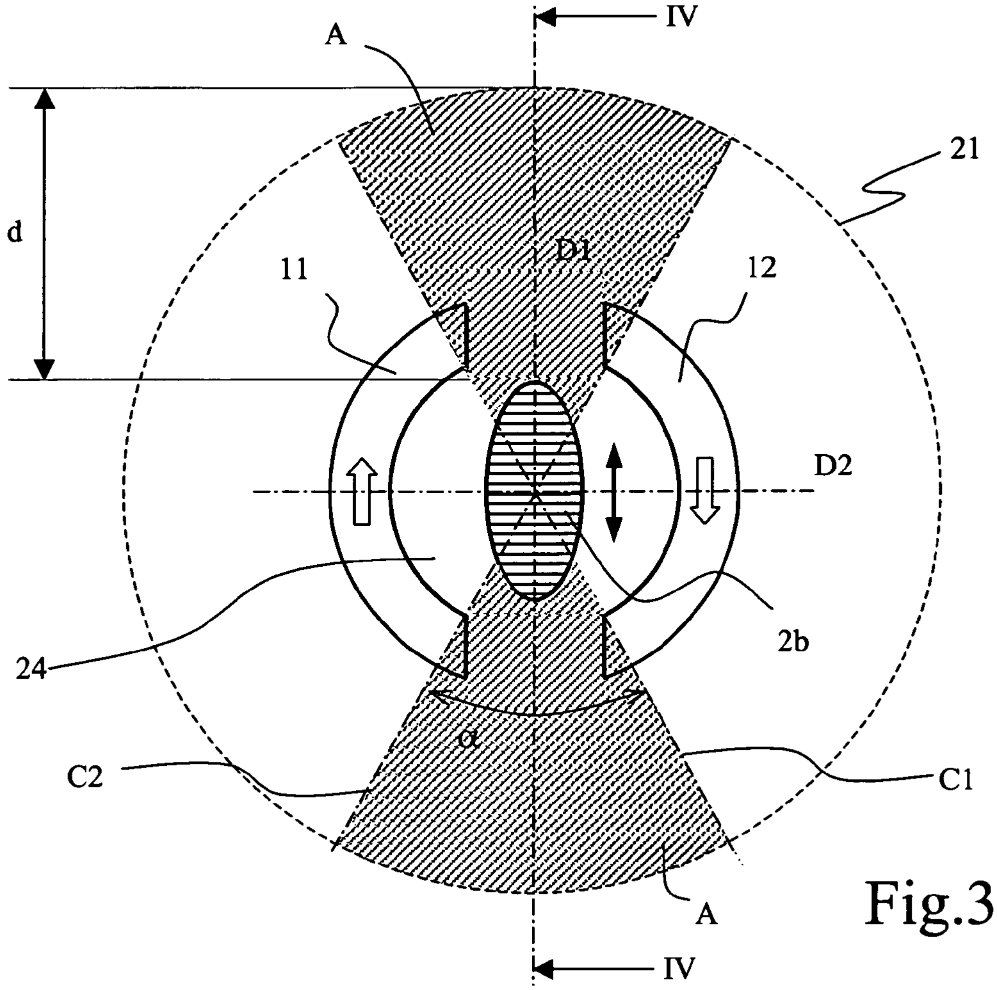

The device 1 for a motorized blind with orientable slats shown in FIG. 2 comprises a command transmitter 2 having a first control interface **2*a* and a second control interface 2*b*, a command receiver 6 connected to a mechanical assembly 4 comprising horizontal slats 5 that can be oriented about their axes, a motor 3 for orienting the slats, and a motor 3'** for moving the slats vertically. The movements of vertical translation and of orientation of the slats can be produced by the action of a single motor.

The first control interface 2*a* comprises two control buttons 11, 12. As in the prior art, the buttons 11 and 12 control the upward and downward movements, respectively, of the slats of the blind by activating the motor 3'.

Figure 4:
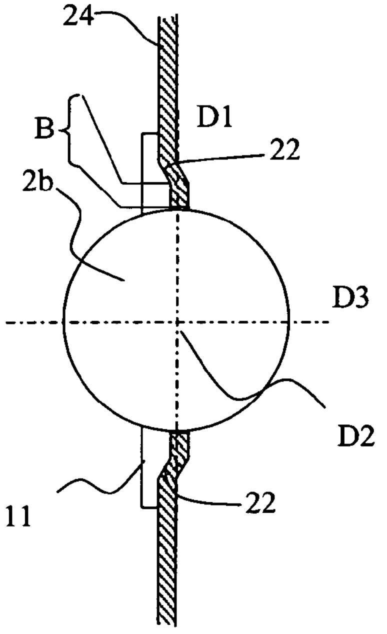

The second control interface 2*b* comprises a wheel. This wheel, shown in FIGS. 3 and 4, is rotatable about an axis D2. It can be used for example to operate a first or second electrical contact depending on its direction of movement and thereby turn the motor 3 in one direction or the other.

Both interfaces are arranged on the same face 24, termed the front face, of the control device. This face is not necessarily flat.

The wheel may be replaced by some other movable element such as a rocker button 2*b*' rotatable about an axis D2' between two end stops (as shown in FIG. 5) or a slider movable between two end stops in a slot formed in the front face of the transmitting device. To operate this element, the user has to act on it in a theoretical axis of operation defined as the projection of the movement of a given point of the element onto the front face of the transmitting device when the device is operated. This direction is indicated by the axis D1.

The advantage of the embodiments of the movable element is their method of operation, since in order to operate the movable element, the user has to slide it and accompany its movement. This is a particularly intuitive way of controlling the orientation of the slats because the movement is slow and monitored by the user throughout the slat-orienting process.

However, in order to ensure that a command is not sent if the user unintentionally continues his action of operating a movable element beyond the movable element on the front face, an exclusion zone A is provided on the front face of the transmitting device. This is a zone in which mechanical action on the transmitting device will not cause a command to be sent to the command receiver 6. This zone must contain no button, or at any rate no button must lie wholly within this zone: the geometry of a button may certainly overlap this zone provided that an action on the button at this point will not cause a command to be sent to the command receiver 6.

This exclusion zone extends at least on opposite sides of the movable element in the theoretical axis of operation and is adjacent to the movable element. It also extends sufficiently to ensure that if the user continues an action on the movable element unintentionally past the movable element on the front face, this does not result in a command being sent.

In a first alternative embodiment, the exclusion zone A is defined by two straight lines C1, C2 intersecting in the center of the movable element and forming an angle $\alpha$ of 60°, the bisector of which is parallel to the theoretical axis of operation.

The exclusion zone is also defined by a circle 21 whose center is on the center of the movable element and whose circumference is separated by a distance d from the movement element, this distance being 20 mm.

In a preferred alternative, the angle $\alpha$ is 50° and the distance d is 10 mm.

Advantageously, the transmitting device comprises, in the exclusion zone A, at least one end stop 22 forming a protuberance on the front face 24 near the movable element, for example in the zone marked B in FIG. 4. This end stop may for example be a slope on the front face (as shown in FIG. 4) or a bump. Such an end stop will limit actions of operating the movable element from being continued unintentionally by the user past the movable element on the front face. Such an end stop is preferably arranged on either side of the movable element.

The control buttons 11 and 12 are arranged on the front face of the transmitting device on either side of the movable element, preferably on the axis perpendicular to the theoretical axis of operation. The buttons may be arranged symmetrically about the movable element.

In an alternative embodiment shown in FIG. 6, the control device may have other control buttons. It may in particular have buttons 13 and 14 for moving the slats to an intermediate raised position and an intermediate lowered position, respectively, or for moving the slats at slow speed. If the transmitting device has four buttons, the buttons may be arranged symmetrically with respect to each other about the axes D1 and D2.

The control buttons may for example be in the shape of portions of an annulus.

The movable element may advantageously be used to stop the slats when pressure is exerted on it along an essentially perpendicular axis D3. A third contact is therefore necessary to realize this function. It is operated in much the same way as described in paragraph 37 of the publication of application EP 1 486 640 A1.

The command-transmitting device may be a wired remote control as described above, but it may also be a portable wireless remote control, communicating for example by radio or infrared waves with the command receiver, in which case the various actions performed on the various control buttons, sliders or wheels are translated in the transmitting device by an electronic device into an electromagnetic signal.

The transmitting device according to the invention can of course be used to operate any kind of blind or curtain with orientable slats.

The invention claimed is:

1. A command-transmitting device (2) for controlling a motorized blind (4) with orientable slats (5), comprising control buttons (11, 12, 13, 14) and a movable control element (2*b*; 2*b*') movable in two directions along a theoretical axis of operation (D1), these control buttons and this movable control element being arranged on a first face (24) of the transmitting device, in which device the buttons (11, 12, 13, 14) are positioned outside of an exclusion zone (A) defined by two straight lines (C1, C2) intersecting in the center of the movable element and forming an angle ($\alpha$) of 60°, the bisector of which is parallel to the theoretical axis of operation, and by a circle (21) whose center is on the center of the movable element and whose circumference is separated from the latter by a distance (d) of 20 mm, and the buttons (11, 12, 13, 14) controlling the movements of the slats in opposite directions are arranged on either side of the movable element (2*b*; 2*b*').

2. The device (2) as claimed in claim 1, comprising, in the exclusion zone, at least one end stop (22) forming a protuberance on the first face near the movable element.

3. The device (2) as claimed in claim 1, comprising four buttons arranged symmetrically relative to the projection onto the first face of the theoretical axis of operation and to the perpendicular to this projection passing through the center of the movable element.

4. The device (2) as claimed in claim 1, comprising an electrical contact made by a movement of the movable element in a direction (D3) essentially perpendicular to the first face, this contact sending a command to stop the movement of the slats.

5. The device (2) as claimed in claim 1, in which the movable element is a wheel (2*b*) rotatable about an axis (D2), a translationally movable slider, or a button (2*b*') that can be rocked rotationally about an axis (D2').

6. A command-transmitting device (2) for controlling a motorized blind (4) with orientable slats (5), comprising control buttons (11, 12, 13, 14) and a movable control element (2*b*; 2*b*') movable in two directions along a theoretical axis of operation (D1), these control buttons and this movable control element being arranged on a first face (24) of the transmitting device, in which device the buttons (11, 12, 13, 14) are positioned outside of an exclusion zone (A) defined by two straight lines (C1, C2) intersecting in the center of the movable element and forming an angle (α) of 50°, the bisector of which is parallel to the theoretical axis of operation, and by a circle (21) whose center is on the center of the movable element and whose circumference is separated from the latter by a distance (d) of 10 mm, and the buttons (11, 12, 13, 14) controlling the movements of the slats in opposite directions are arranged on either side of the movable element (2*b*; 2*b*').

7. The device (2) as claimed in claim 6, comprising, in the exclusion zone, at least one end stop (22) forming a protuberance on the first face near the movable element.

8. The device (2) as claimed in claim 6, comprising four buttons arranged symmetrically relative to the projection onto the first face of the theoretical axis of operation and to the perpendicular to this projection passing through the center of the movable element.

9. The device (2) as claimed in claim 6, comprising an electrical contact made by a movement of the movable element in a direction (D3) essentially perpendicular to the first face, this contact sending a command to stop the movement of the slats.

10. The device (2) as claimed in claim 6, in which the movable element is a wheel (2*b*) rotatable about an axis (D2), a translationally movable slider, or a button (2*b*') that can be rocked rotationally about an axis (D2').

* * * * *